(12) United States Patent
Ragaly

(10) Patent No.: US 6,229,244 B1
(45) Date of Patent: May 8, 2001

(54) SYNCHRONOUS MACHINE, IN PARTICULAR GENERATOR FOR A MOTOR VEHICLE

(75) Inventor: Istvan Ragaly, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/244,932

(22) Filed: Feb. 4, 1999

(30) Foreign Application Priority Data

Feb. 7, 1998 (DE) .......................................... 298 02 113 U

(51) Int. Cl.[7] .................................. H02K 1/22; H02K 1/32
(52) U.S. Cl. ............................ 310/263; 310/180; 310/190
(58) Field of Search ..................................... 310/179, 180, 310/184, 186, 190, 198, 210, 257, 261, 263; 29/596, 597, 598

(56) References Cited

U.S. PATENT DOCUMENTS 4,900,968 * 2/1990 Feigel et al. ......................... 310/260
5,444,321 * 8/1995 Honda et al. ........................ 310/263
5,483,116 * 1/1996 Kusase et al. ....................... 310/263
5,783,888 * 7/1998 Yamano ................................. 310/91

FOREIGN PATENT DOCUMENTS 89 05 353    4/1990   (DE) .

* cited by examiner

Primary Examiner—Tran Nguyen
(74) Attorney, Agent, or Firm—Michael J. Striker

(57) ABSTRACT

A synchronous machine formed as a generator for a motor vehicle has a stator, a rotor, an excitation system composed of a plurality of electrically excited individual poles provided in the stator and the rotor and formed as claw poles excited by a joint excitation coil, and a stray field compensation device arranged in free spaces between the claw poles, the stray field compensation device being formed as an additional winding through which current flows and which surrounds the claw poles so that an axial current direction changes from one free space to another free space and a current to neighboring claw poles produces an additional flux which supports a main flux and counteracts a stray flux.

11 Claims, 2 Drawing Sheets

SYNCHRONOUS MACHINE, IN PARTICULAR GENERATOR FOR A MOTOR VEHICLE

BACKGROUND OF THE INVENTION

The present invention relates to a synchronous machine, in particular a generator for a motor vehicle, provided with an excitation system composed of a plurality of electrically excited individual poles in a stator or a rotor, preferably in form of claw poles excited by at least one joint excitation coil, and with a stray flux compensation device arranged in free spaces between the claw poles.

A synchronous machine of this type is disclosed for example in the German patent documents DE-PS 1209651 and DE 8905353 U1. Permanent magnets are utilized as the stray flux compensation device, which are arranged in the stray flux region between the claw poles. The mounting of the permanent magnets between the claw poles requires especially constructed claw poles or additional holding parts. Therefore, not only the construction of the synchronous machine becomes expensive, but also the compensation of the stray flux is dependent on temperature, aging and tolerances of the construction of the claw poles.

SUMMARY OF THE INVENTION

Accordingly, it is an object of the present invention to provide a synchronous machine of the above mentioned type, which eliminates the disadvantages of the prior art.

More particularly, it is an object of the present invention to provide a synchronous machine of this type, in which a compensation of the stray flux is provided so that a simplification is obtained in the construction of the synchronous machine, and also the influence of temperature, aging and tolerances is reduced to an insignificant value.

In keeping with these objects and with others which will become apparent hereinafter, one feature of present invention resides, briefly stated, in a synchronous machine in which the stray flux compensation device is formed as an additional winding through which current flows and which surrounds the claw poles so that the current direction changes from one free space to another free space and a current to the neighboring claw poles produces an additional flux which supports the main flux and counteracts the stray flux.

The additional winding is easily arranged and requires no expensive mounting. The additional winding contributes in this way for support of the main flux or for reduction of the stray flux, and at the same time it does not change the properties of the compensation, such as for example the coercitive force with the permanent magnets.

The aging of the additional winding is insignificant and the additional winding is not susceptible to the counter field, so that a booster excitation is possible. The tolerances of the claw poles can not exert any action on the efficiency of the stray field compensation. Moreover the magnetization can be dispensed with.

In accordance with a preferable embodiment of the present invention, the additional winding is guided meanderingly around the claw poles. The electrical properties of the additional winding can be provided in a simple manner so that the additional winding is connected in series with the excitation winding.

The design can be also selected so that the additional winding is composed of thin wires with many windings, which are connected parallel to the excitation winding.

The additional winding can be surrounded by synthetic plastic, glass fiber or anti-magnetic material, and joined by adhesion or impregnation to form a compact unit. This facilitates the mounting of the additional winding in the stray field regions also when the rotor and stator is prefabricated.

In order to sufficiently fix the additional winding on a rotor with high rotary speeds, to compensate the centrifugal forces, in accordance with a further embodiment of the present invention the claw poles are formed as parts of plates, and the winding parts of the additional winding which face the plates are connected with the plates by anti-magnetic mounting means. The mounting means can be formed in a shell-like manner.

In order to provide a sufficient strength, additionally the free ends of the claw poles can be fixedly connected with the facing opposite-pole plates by the anti magnetic connectors.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
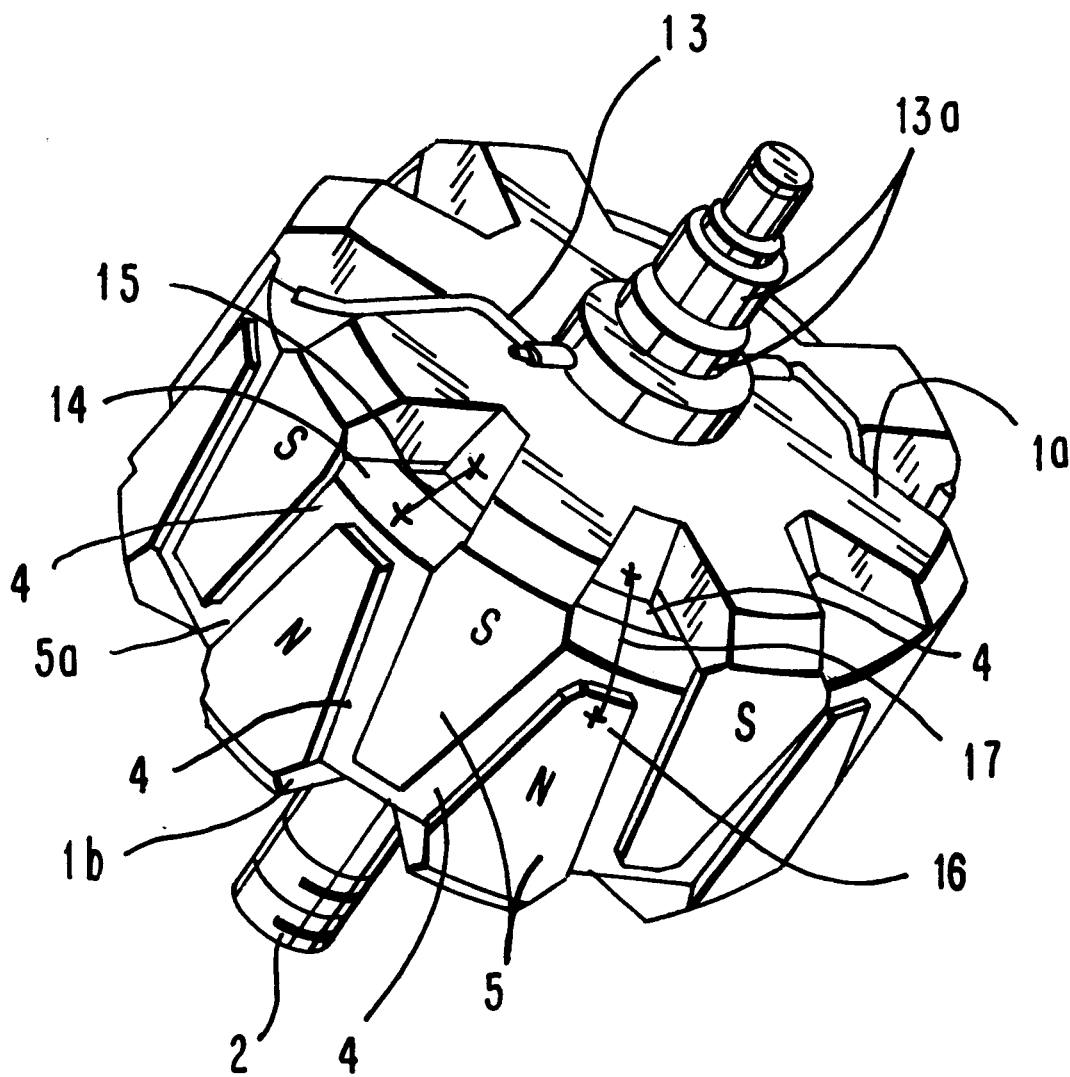
FIG. 1 is a perspective view of a rotor of synchronous machine in accordance with the present invention.
Figure 2:
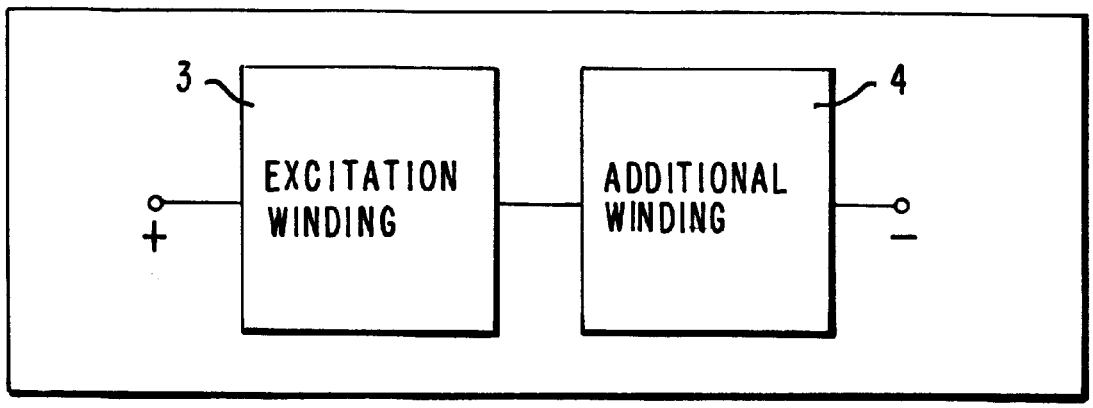
FIG. 2 is a view showing a cross-section of the inventive synchronous machine with and without a stray field compensation.
Figure 3:
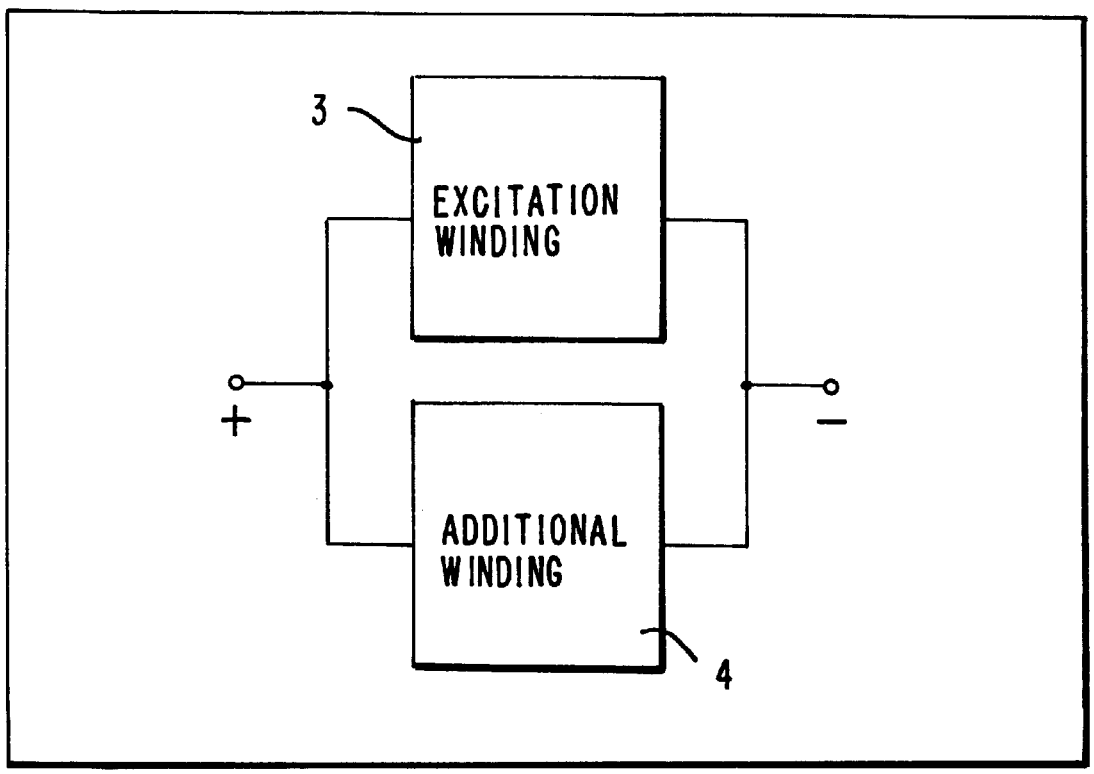
FIG. 3 is a view showing a connection of the excitation winding with the additional winding of the inventive synchronous machine.

A synchronous machine as shown in FIGS. 1 and 2 has a rotor which is mounted on a shaft 2 with pole core 1, and a stator 12 provided with counter poles and surrounding the rotor. An excitation winding 3 is arranged on the pole core 1. It produces a magnetic flux in the pole core 1. The both ends of the pole core 1 are in a magnetically conductive connection with plates 1a and 1b. The plates 1a and 1b carry pole claws 5, which during the excitation of the excitation winding 3, form the North pole N or the south pole S.

The pole claws (N and S) of both plates are oriented opposite to one another and nested in one another. The North pole N and the South pole S alternate in the peripheral direction. It must be guaranteed that the both plates 1a and 1b have the same number of the claw poles 5. Free spaces 5a which remain between the neighboring claw poles 5 (N and S) extend in the shown embodiment not parallel to the shaft 2 due to the reducing claw poles 5 (N and S). Instead, they are arranged at an angle relative to one another and to the axis of the shaft. The free spaces 5a between the claw poles 5 (N and S) are filled with an additional winding 4. In the shown embodiment the additional winding 4 is meander-shaped and injection molded of insulating material.

The excitation winding 3 and the additional winding 4 are supplied with current through two terminals 13 via a commutation ring arrangement 13a. The additional winding 4 can be connected with the excitation winding 3 in series or in parallel.

The operation of the inventive stray flux compensation device is illustrated in the cross-section shown in FIG. 2. The magnetic flux in the upper half of the separated cross-section illustrates the not-compensated synchronous machine, while in the lower half the magnetic flux in the compensated synchronous machine is shown.

The main flux extending from the North pole N to the stator 12 is identified in the upper half with reference numeral 7. The main flux which flows back from the stator 12 to the South pole S is identified with reference numeral 8. The stray flux which extends from the North poles N and in a peripheral direction to the neighboring South poles S is identified with reference numeral 9. This stray flux 9 can amount up to 30% of the magnetic flux produced in the rotor and unfavorably loads the magnetic circuit of the rotor.

The meander-shaped additional winding 4 is composed of one or several windings. It is designed so that in the free spaces 5a the axial current direction 6 changes from one free space 5a to another free space 5a. With the thusly formed conductors or windings of the additional winding 4, a compensation magnetic field 10 and 11 is produced.

A useful flux produced by the additional winding 4 is identified with reference numeral 10. It supports the main flux 7 of the claw poles 5 excited by the North pole N. The compensation flux produced by the additional winding 4 is identified with reference numeral 11. It counteracts the stray flux 9 in the peripheral region and reduces its action. The additional winding 4 therefore improves the efficiency of the synchronous machine in a simple way.

During the mounting, the additional winding 4 after arranging the excitation winding 3 on the pole core 1 is fitted over the excitation winding 3 and connected with it. Then the plates 1a and 1b are mounted.

The additional winding 4 has winding points 14 which face the blades 1a and 1b and are connected with the blades by antimagnetic mounting means 15. The claw poles 5 have free ends 16 which are fixedly connected with facing opposite-pole plates by an antimagnetic connector 17.

It will be understood that each of the elements described above, or two or more together, may also find a useful application in other types of constructions differing from the types described above.

While the invention has been illustrated and described as embodied in a synchronous machine, in particular generator for a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

What is claimed is:

1. A synchronous machine formed as a generator for a motor vehicle, comprising a stator; a rotor; an excitation system composed of a plurality of electrically excited individual poles provided in said stator and said rotor and formed as claw poles excited by a joint excitation coil; and a stray field compensation device arranged in free spaces between said claw poles; said stray field compensation device being formed as an additional winding through which a current flows and which surrounds said claw poles so that an axial current direction of the current; changes from one free space to another free space and the current to neighboring claw poles produces an additional flux which supports a main flux and counteracts a stray flux, said additional winding being composed of a single wire which is wound in a meandering form, and which is formed as a meandering coil which meanderingly surrounds said claw poles and has a generally ring shape and has straight wire regions arranged in the free spaces.

2. A synchronous machine as defined in claim 1, and further comprising plates, said claw poles being formed on said plates.

3. A synchronous machine as defined in claim 1, wherein said additional winding is arranged around said claw poles in a meander-like manner.

4. A synchronous machine as defined in claim 1, wherein said additional winding is connected in series with said excitation winding.

5. A synchronous machine as defined in claim 1, wherein said additional winding is composed of thin wires with a plurality of windings connected parallel to said excitation winding.

6. A synchronous machine as defined in claim 1, wherein said additional winding is surrounded by a material selected from a group consisting of a synthetic plastic, a glass fiber, and an anti-magnetic material.

7. A synchronous machine as defined in claim 1, wherein said additional winding is assembled by adhesion to form a compact unit.

8. A synchronous machine as defined in claim 1, wherein said additional winding is assembled by impregnation to form a compact unit.

9. A synchronous machine as defined in claim 1, wherein said claw poles are parts of plates, said additional winding having winding points which face said plates and are connected with said plates by antimagnetic mounting means.

10. A synchronous machine as defined in claim 9, wherein said mounting means is shell-shaped.

11. A synchronous machine as defined in claim 1, wherein said claw poles have free ends which are fixedly connected with facing opposite-pole plates by an antimagnetic connector.

\* \* \* \* \*